(12) United States Patent
Inukai et al.

(10) Patent No.: US 8,480,521 B2
(45) Date of Patent: Jul. 9, 2013

(54) FLAT BELT

(75) Inventors: Masahiro Inukai, Kobe (JP); Yoshiyuki Kitano, Kobe (JP)

(73) Assignee: Bando Kagaku Kabushiki Kaisha, Kobe-Shi (JP)

( * ) Notice: Subject to any disclaimer, the term of this patent is extended or adjusted under 35 U.S.C. 154(b) by 293 days.

(21) Appl. No.: 12/937,658

(22) PCT Filed: Apr. 17, 2009

(86) PCT No.: PCT/JP2009/001774
§ 371 (c)(1),
(2), (4) Date: Oct. 13, 2010

(87) PCT Pub. No.: WO2009/130868
PCT Pub. Date: Oct. 29, 2009

(65) Prior Publication Data
US 2011/0031087 A1    Feb. 10, 2011

(30) Foreign Application Priority Data

Apr. 21, 2008  (JP) ................. 2008-110119

(51) Int. Cl.
*F16G 1/08*   (2006.01)
(52) U.S. Cl.
USPC ...................................................... 474/237
(58) Field of Classification Search
USPC ................. 474/237; 192/84.3, 84.8
See application file for complete search history.

(56) References Cited

U.S. PATENT DOCUMENTS

| 2,084,784 A * | 6/1937 | Stahl ............................... 51/299 |
| 6,758,779 B2 * | 7/2004 | Fujimoto ....................... 474/260 |
| 2012/0165145 A1 * | 6/2012 | Kitano et al. .................. 474/264 |

FOREIGN PATENT DOCUMENTS

| JP | 57137744 A | 8/1982 |
| JP | 11108120 A | 4/1999 |
| JP | 2006242132 A | 9/2006 |
| JP | 2009228768 A * | 10/2009 |

OTHER PUBLICATIONS

Machine English Translation of JP 2006242132.*
Machine English Translation of JP 11108120.*
Machine English Translation of JP 2009228468.*
International Search Report for PCT/JP2009/001774 dated Jun. 10, 2009.

* cited by examiner

*Primary Examiner* — William E Dondero
*Assistant Examiner* — Diem Tran
(74) *Attorney, Agent, or Firm* — Marshall, Gerstein & Borun LLP

(57) ABSTRACT

A flat belt includes a tension-resistant layer, in which a core cord is spirally wound, an upper holding rubber layer, a lower holding rubber layer, an upper rubber layer, and a lower rubber layer. The holding rubber layers and are laid on the upper and lower sides of the tension-resistant layer respectively, retaining the layer. The upper and lower rubber layers and are laid on the upper side of the upper holding rubber layer and the lower side of the lower holding rubber layer respectively. 150-300 parts by weight of ferrite for 100 parts by weight of rubber matrix are mixed in the upper rubber layer, which is on the outer peripheral side of the flat belt when the belt is wound on a guide wheel.

12 Claims, 7 Drawing Sheets

(a)

(b)

(a)

(b)

(c)

FLAT BELT

FIELD OF THE INVENTION

The present invention relates to a flat belt for use in a belt-type clutch mechanism.

BACKGROUND OF THE INVENTION

A conventional belt-type clutch mechanism is known that transmits mechanical power by bringing a flat belt into contact with the outer peripheral frictional surface of a rotating member by applying belt tension, and that interrupts the power transmission by bringing the belt out of contact with the frictional surface by slackening the tension.

When such a clutch mechanism interrupts mechanical power, the rotating member idles. While the power is interrupted, the frictional surface of the rotating member and the flat belt would keep slipping on each other. Therefore, in order to keep the durability of the clutch mechanism from decreasing due to friction, the mechanism includes a means for biasing the flat belt radially outward to bring it out of contact with the frictional surface of the rotating member.

As a known biasing means of such a type (for example, refer to Patent Document 1), iron as a magnetic material is kneaded into the rubber layer of a flat belt, and a magnet is spaced outward from the frictional surface of a rotating member radially of the member. When mechanical power is interrupted, the magnetic force of the magnet brings the flat belt out of contact with the frictional surface, keeping the durability from decreasing due to friction.

Flat belts for magnetic flaw detection are known (for example, refer to Patent Document 2). Each of these belts includes one or two rubber layers in which 150-300 parts by weight of magnetic material (magnetic powder of ferrite or the like) for 100 parts by weight of rubber matrix are mixed. One of the belts further includes a tension-resistant layer, and two such rubber layers are laid on the upper and lower sides of the tension-resistant layer. Another of the belts further includes two tension-resistant layers, which are laid on the upper and lower sides of such a rubber layer. Still another of the belts further includes a tension-resistant layer, and such a rubber layer is laid on the tension-resistant layer.

So, it is conceivable to use in the clutch mechanism disclosed in Patent Document 1 the flat belt disclosed in Patent Document 2.

PRIOR ART DOCUMENTS

Patent Documents

Patent Document 1: JP 2006-242132 A (paragraphs 0044-0057 and FIGS. 2 and 3)
Patent Document 2: JP H11-108120 A (paragraphs 0019-0025 and FIG. 1)

SUMMARY OF THE INVENTION

Problems to be Solved by the Invention

To do so would cause the following problems.

(i) When mechanical power is transmitted to the flat belt including a tension-resistant layer and two rubber layers between which the tension-resistant layer is laid, and in which magnetic material is mixed, mechanical power transmission takes place between the rotating member and the rubber in which the magnetic material is mixed. The mixing of 150-300 parts by weight of magnetic material for 100 parts by weight of rubber matrix lowers physical characteristics such as tensile strength and tearing strength of the rubber layers (refer to FIG. 7), so that these layers lack strength. As a result, the cracking and exfoliation of the rubber layers become large in an early stage, damaging them.

(ii) The flat belt including two tension-resistant layers and a rubber layer that is laid between them, and in which magnetic material is mixed, transmits mechanical power by bringing one of the tension-resistant layers into direct contact with the rotating member, so that this tension-resistant layer damages at an early stage. Because the magnetic force of the magnet acts only through the tension-resistant layers, it is impossible to secure sufficient magnetic force for bringing the flat belt out of contact with the frictional surface of the rotating member.

(iii) Likewise, the flat belt including a tension-resistant layer and a rubber layer that is laid on the tension-resistant layer, and in which magnetic material is mixed, transmits mechanical power by bringing the tension-resistant layer into direct contact with the rotating member, so that the tension-resistant layer damages at an early stage.

The inventors have made the present invention by basing it on their knowledge that, in order to secure the power transmission interrupting function of the clutch mechanism, it is necessary to mix a certain amount of magnetic material in the rubber component, but in order to keep the physical characteristics from lowering, it is preferable not to mix magnetic material in the rubber part for contact with the rotating member, and by conceiving that they can solve the foregoing problems by providing a lower rubber layer on the inner peripheral side for contact with the rotating member and an upper rubber layer on the outer peripheral side, which is opposite to the lower rubber layer, and, instead of mixing magnetic material uniformly in the whole rubber layer or layers, forming the upper rubber layer of rubber in which magnetic material is mixed.

The object of the present invention is to provide a flat belt that, if it is used for a clutch mechanism as described above, can, without impairing the power transmission interrupting function of the mechanism, prevent the lower rubber layer on the inner peripheral side for contact with a rotating member from damaging an early stage.

Means for Solving the Problems

The invention claimed in claim 1 is a flat belt for use in a clutch mechanism that transmits mechanical power to a rotating member by bringing the belt into contact with the outer peripheral frictional surface of the rotating member by applying belt tension to the belt, and that interrupts the power transmission by forcing the belt away from the frictional surface by means of the magnetic force of a magnet by slackening the belt tension, the belt comprising a lower rubber layer laid on the inner peripheral side for contact with the rotating member and an upper rubber layer laid on the outer peripheral side opposite to the lower rubber layer, the upper rubber layer being formed of rubber in which magnetic material is mixed.

As stated above, the upper rubber layer on the outer peripheral side is formed of rubber in which magnetic material is mixed. Accordingly, when the clutch mechanism interrupts the power transmission, the magnet positioned outside the upper rubber layer exerts magnetic attraction directly on this layer so as to bring the flat belt effectively out of contact with the rotating member.

Because the upper rubber layer on the outer peripheral side is formed of rubber in which magnetic material is mixed, the magnetic force of the magnet can bring the flat belt out of contact with the outer peripheral frictional surface of the rotating member. Therefore, it is not essential that the lower rubber layer on the inner peripheral side for contact with the rotating member be formed of rubber in which magnetic material is mixed. Accordingly, in order to avoid damaging at an early stage, the lower rubber layer can be formed of rubber fine in physical characteristics such as tensile strength and tearing strength.

Consequently, when the clutch mechanism interrupts the power transmission, it is possible to both bring the flat belt effectively out of contact with the rotating member and avoid early damage to the belt.

In this case, as claimed in claim 2, the magnetic material may be ferrite.

In order for the flat belt to be brought reliably out of contact with the rotating member when the clutch mechanism interrupts the power transmission, it is preferable that, as claimed in claims 3, 150-300 parts by weight of ferrite for 100 parts by weight of rubber matrix be mixed in the upper rubber layer.

As claimed in claim 4, an upper holding rubber layer and a lower holding rubber layer may be laid between the upper side of the lower rubber layer and the lower side of the upper rubber layer, and a tension-resistant layer may be held by the holding rubber layers. The holding rubber layers may be omitted, and, as claimed in claim 5, a tension-resistant layer may be interposed between the upper side of the lower rubber layer and the lower side of the upper rubber layer.

The omission of the holding rubber layers is advantageous in thinning the flat belt.

Effects of the Invention

If the present invention as described above is used in a clutch mechanism as described above, the flat belt can, when the mechanism interrupts the power transmission, be brought out of contact with the rotating member by the magnetic attraction to the magnet, which is positioned outside the belt. Because the lower rubber layer for contact with the rotating member can be formed of rubber fine in physical characteristics such as tensile strength and tearing strength, this layer can avoid damaging at an early stage.

EMBODIMENTS OF THE INVENTION

Embodiments of the present invention will be described below with reference to the drawings.

Embodiment 1

Before a flat belt according to the present invention for a one-way clutch is described, an engine starter to which the clutch is applied will be described.

Figure 2:
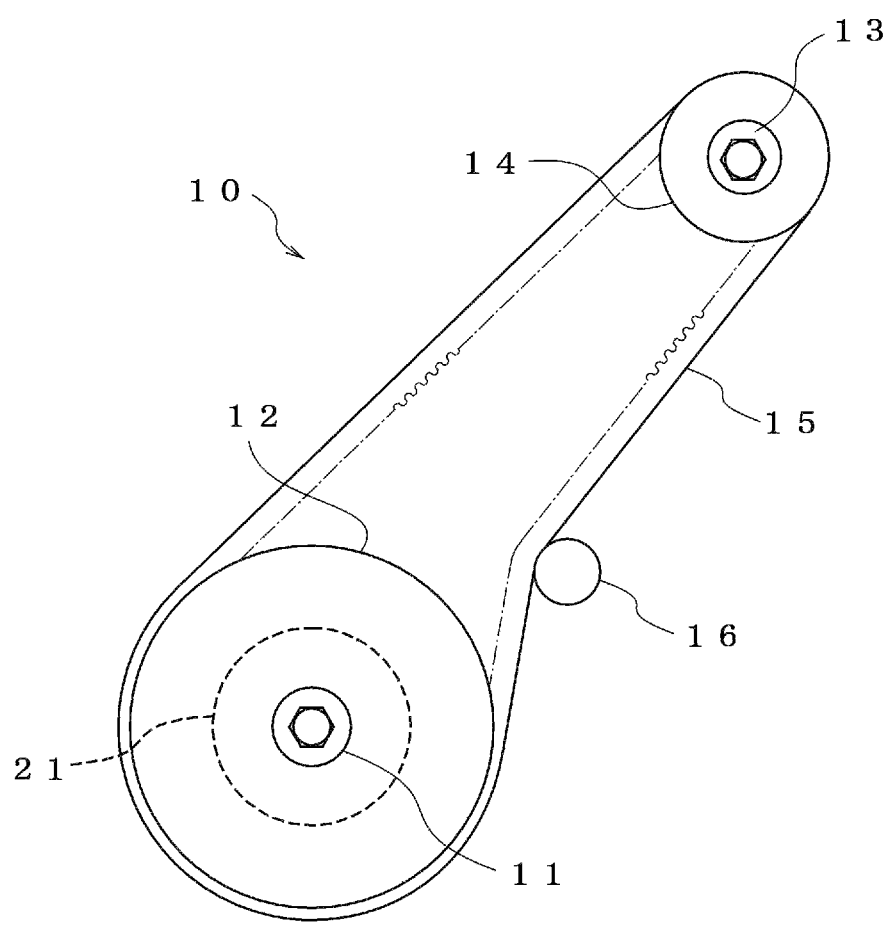
FIG. 2 is a sectional view schematically showing an engine starter to which a one-way clutch including a flat belt according to the present invention is applied.

As shown in FIG. 2, an engine starter 10 includes a crank pulley 12, which is a driven toothed pulley, and a motor pulley 14, which is a driving toothed pulley. The crank pulley 12 is fitted on the crank shaft 11 of an engine (not shown). The motor pulley 14 is fitted on the output shaft 13 of a starting motor (not shown). The pulleys 12 and 14 are coupled by a toothed belt 15 (a synchronous belt).

A one-way clutch 21 (a clutch mechanism) is provided between the crank shaft 11 and crank pulley 12 so as to transmit the driving force of this pulley in the direction of rotation (clockwise in FIG. 1) to this shaft. When the engine starts, the one-way clutch 21 allows the motor to rotate the crank shaft 11 by driving the toothed belt 15. After the engine starts, the one-way clutch 21 prevents the rotation of the crank shaft 11 from being transmitted to the motor. The loose span of the toothed belt 15 is pressed by a tension pulley 16 so as to be kept under a specified tension.

Figure 3:
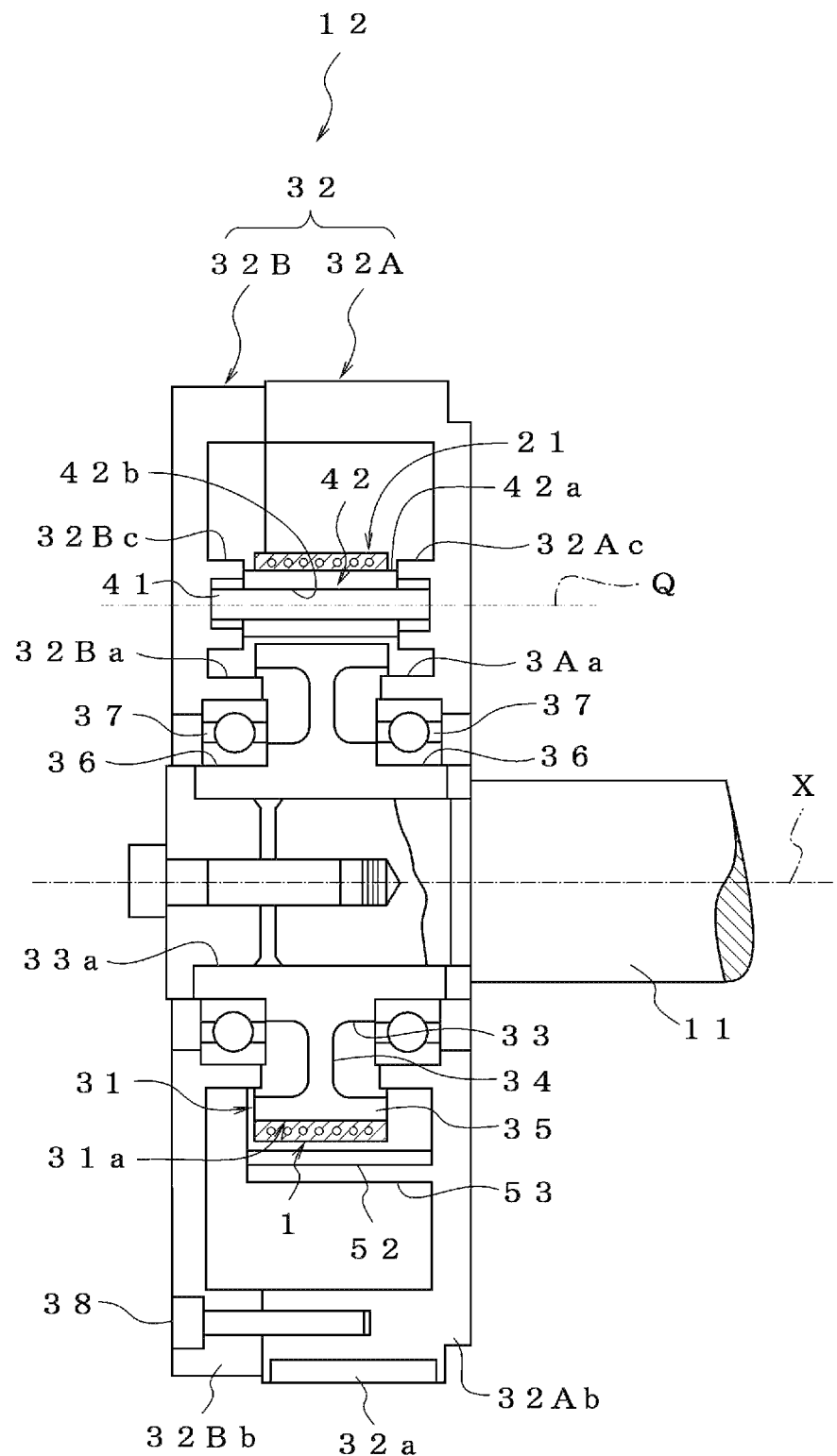
FIG. 3 is a sectional view of the one-way clutch along line III-III in FIG. 4.
Figure 4:
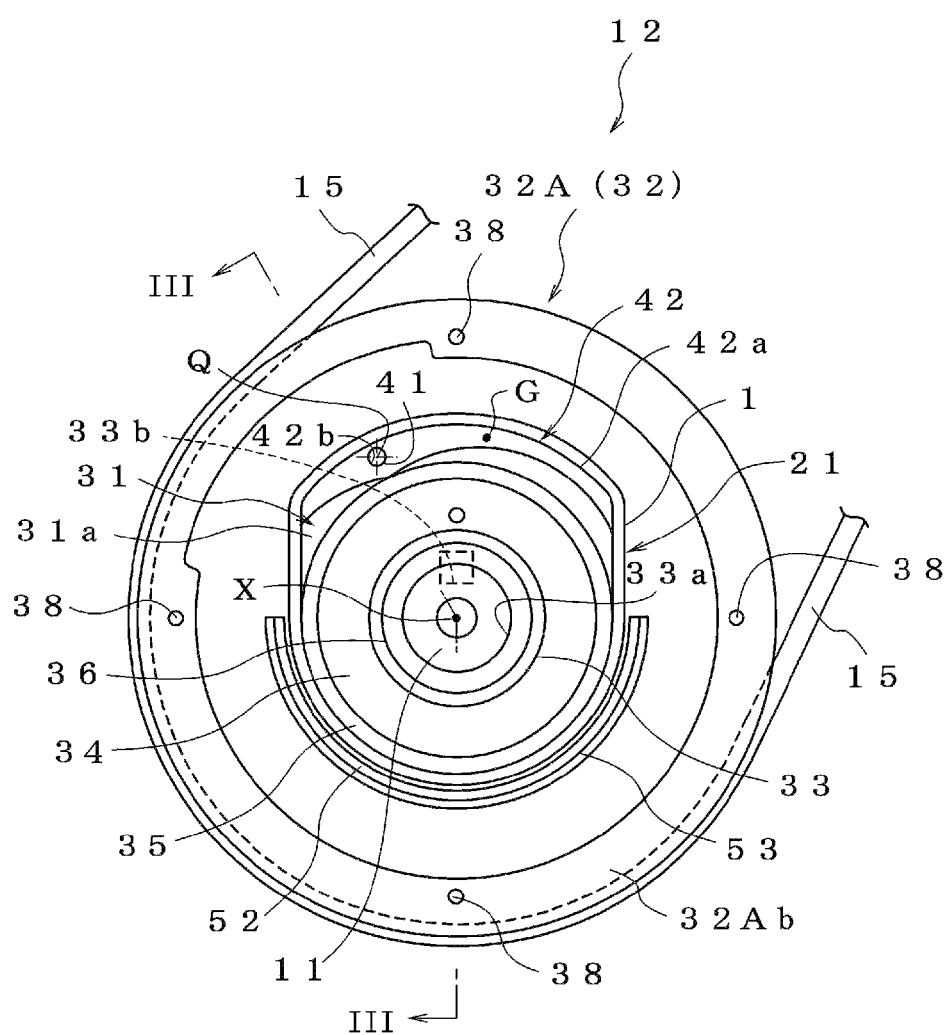
FIG. 4 is a view of the one-way clutch as seen from the opposite side to a crank shaft, with the other side case etc. removed from the clutch.

As shown in FIGS. 3 and 4, the one-way clutch 21 includes a guide wheel 31 (a rotating member), which is a flat pulley, and a case 32 in the form of a hollow doughnut, which houses the wheel 31 rotatably on the axis (X) of the wheel. The boss 33 of the guide wheel 31 is coupled coaxially to the crank shaft 11, which is a driven shaft. As will be stated later on, the clutch case 32 has grooves 32a (only one shown in FIG. 3) formed in its outer periphery at a pitch matching the tooth form of the toothed belt 15. The clutch case 32 forms the crank pulley 12, which engages with the toothed belt 15.

The wheel boss 33 has a coupling hole 33a, through which the crank shaft 11 extends. The coupling hole 33a has a key groove 33b (shown only in FIG. 4), with which a key engages to join the guide wheel 31 and crank shaft 11 together. The guide wheel 31 includes an outer peripheral disk 34 and an outer cylindrical part 35. The wheel boss 33 is surrounded by the peripheral disk 34, which is surrounded by the cylindrical part 35. The outer peripheral surface of the cylindrical part 35 is a frictional surface 31a, on which a flat belt 1 is wound.

Figure 1:
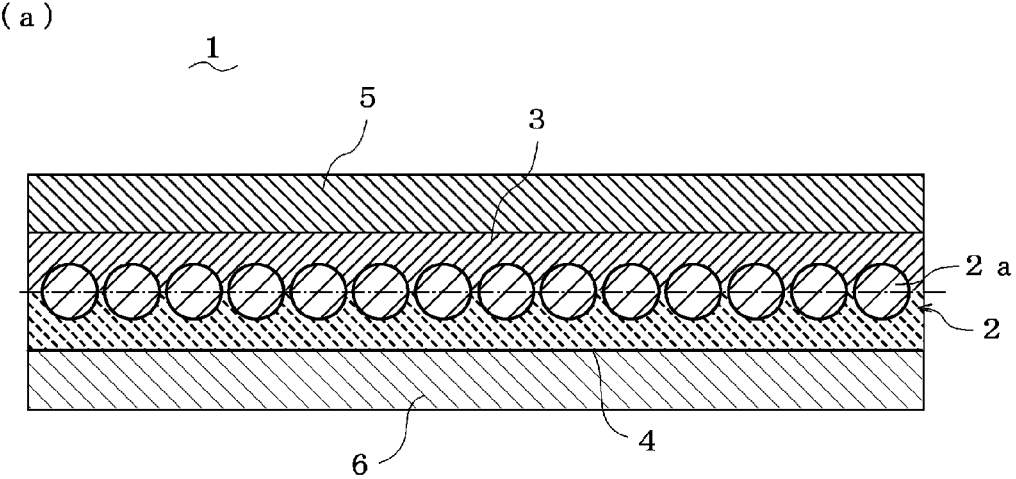
FIGS. 1(a) and 1(b) are sectional views schematically showing flat belts that are embodiments of the present invention.
Figure 1:
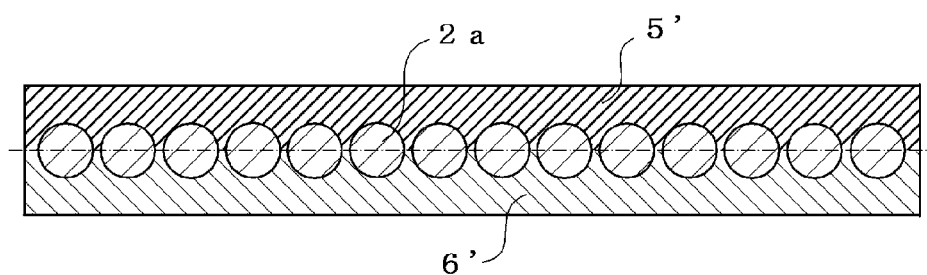
Figure 7:
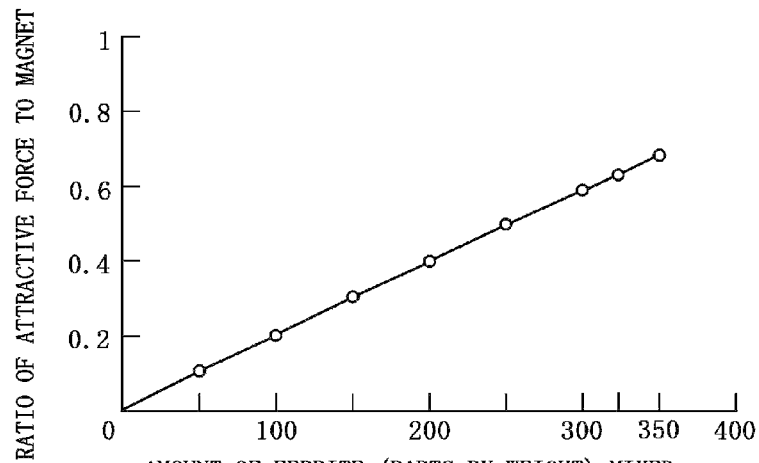
FIG. 7(a) is a graph showing the relationship between the amount of ferrite mixed for 100 parts by weight of rubber matrix and the ratio of attractive force to a magnet.
FIG. 7(b) is a graph showing the relationship between the amount of ferrite mixed for 100 parts by weight of rubber matrix and the breaking (cutting) extension ratio during rubber extension.
FIG. 7(c) is a graph showing the relationship between the amount of ferrite mixed for 100 parts by weight of rubber matrix and the thickness change ratio during an abrasion test.
Figure 7:
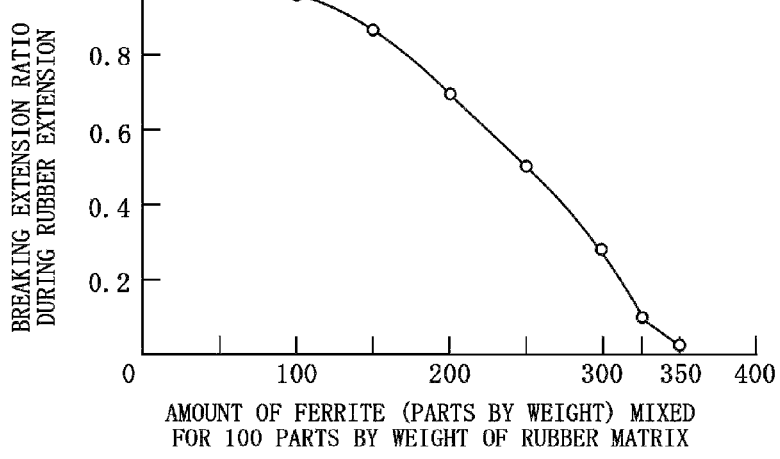
Figure 7:
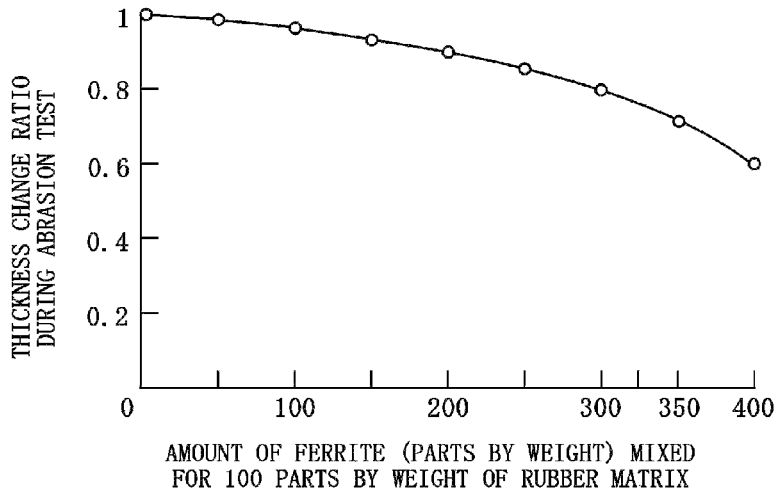

As shown in FIG. 1, the flat belt 1 includes a tension-resistant layer 2, in which a core cord 2a is spirally wound, an upper holding rubber layer 3, and a lower holding rubber layer 4. The rubber layers 3 and 4 are laid on the upper and lower sides of the tension-resistant layer 2 respectively, holding the layer 2. An upper rubber layer 5, in which ferrite as a magnetic material is mixed in a certain ratio, is laid on the upper side of the upper holding rubber layer 3. A lower rubber layer 6 is laid on the lower side of the lower holding rubber layer 4. When the flat belt 1 is wound on the guide wheel 31, the upper rubber layer 5 and lower rubber layer 6 are on the outer and inner peripheral sides respectively. 150-300 parts by weight of ferrite (magnetic material) for 100 parts by weight of rubber matrix are mixed in the upper rubber layer 5. Ferrite does not need to be mixed in the lower rubber layer 6 but may be mixed in it in the production process. Even if 0-50 parts by weight of ferrite are mixed for 100 parts by weight of rubber matrix in the lower rubber layer 6, which is in contact with the guide wheel 31, physical characteristics (tensile strength, tearing strength, etc.) of rubber do not lower, so that the cracking and exfoliation of this layer may not become large in an early stage. If the amount of ferrite mixed in the lower rubber layer 6 ranges between 0 and 50 parts by weight for 100 parts by weight of rubber matrix, the attractive force to a magnet varies somewhat, as shown in FIG. 7. In this case, however, it has been confirmed that, because the breaking (cutting) extension ratio during rubber extension and the thickness change ratio during an abrasion test vary little, the physical characteristics (tensile strength, tearing strength, etc.) of rubber do not vary greatly, and the contacting function with respect to the guide wheel 31 does not vary greatly.

The wheel boss 33 has a pair of bearing seating surfaces 36 formed around both its side parts. The seating surfaces 36 are smaller in diameter than the outer periphery of the middle part of the wheel boss 33. The inner race of a bearing 37 is fitted to each of the seating surfaces 36 so as to rotate with the guide wheel 31. The bearings 37 on both of the seating surfaces 36 enable the clutch case 32 to be fitted rotatably to the guide wheel 31.

The clutch case 32 consists of a pair of case members 32A and 32B. With reference to FIG. 3, the case members 32A and 32B are positioned on the right and left sides respectively of the guide wheel 31. The case members 32A and 32B have inner cylindrical peripheral walls 32Aa and 32Ba respectively formed at their inner peripheries and axially facing each other. The outer race of each bearing 37 is fitted to the inner periphery of the adjacent peripheral wall 32Aa or 32Ba so as to rotate with the wall.

The case members 32A and 32B further have outer cylindrical peripheral walls 32Ab and 32Bb respectively formed at their outer peripheries coaxially with each other. The adjacent edges of the peripheral walls 32Ab and 32Bb are jointed together, so that these walls integrally form an outer peripheral part of the clutch case 32. The peripheral wall 32Ab has four tapped holes formed at circumferentially regular intervals and opening in its edge face. The peripheral wall 32Bb has four bolt holes formed through it. A bolt 38 extends through each of the bolt holes of the case member 32B and engages with each of the tapped holes of the case member 32A, joining the case members 32A and 32B together.

The outer peripheral cylindrical wall 32Ab of the case member 32A is axially longer than the other case member 32B and has grooves 32a, which engage with the teeth of the toothed belt 15.

In the one-way clutch 21 of this embodiment, a needle roller 41, which is an axial member, is spaced radially outward (upward in FIG. 3) from the frictional surface 31a of the guide wheel 31. The axis Q of the needle roller 41 is parallel to the axis X of the guide wheel 31. The case members 32A and 32B have bosses 32Ac and 32Bc formed on the inner sides of their respective main bodies (parts in the form of bored disks each connecting the associated inner and outer peripheral walls). Each of the bosses 32Ac and 32Bc has an axial hole, which engages with one end of the needle roller 41 so that the roller can rotate with the clutch case 32.

A rocking plate 42 is supported by the needle roller 41 radially outside the frictional surface 31a of the guide wheel 31 and can rock around the roller axis Q. The rocking plate 42 has a frictional surface 42a, which is circular in cross section, at its outer periphery. Specifically, the rocking plate 42 has a through hole 42b formed axially through it circumferentially between its middle and its trailing end (left in FIG. 4). The needle roller 41 extends through the through hole 42b, supporting the rocking plate 42.

The flat belt 1 is wound on the frictional surfaces 31a and 42a of the guide wheel 31 and rocking plate 42, with two spans formed between the wheel and the plate.

As seen along the wheel axis X in FIG. 4, the center of gravity G of the rocking plate 42 is positioned between the leading end (right in FIG. 4) of the plate and the roller axis Q, on which the plate rocks. Accordingly, when the rotation of the clutch case 32 exerts centrifugal force (inertia force radial of the axis X) on the rocking plate 42, the plate 42 turns around the needle roller 41 counterclockwise in FIG. 4, so that a leading end portion (right in FIG. 4) of the plate 42 presses one of the spans (the right span in FIG. 4) of the flat belt 1 outward.

More specifically, when the driving force from the motor rotates the clutch case 32 (crank pulley 12) by means of the toothed belt 15 clockwise in FIG. 4, the rocking plate 42 presses the loose span (the right span in FIG. 4) of the flat belt 1, applying initial tension to this belt.

The one-way clutch 21 includes a magnet 52 fitted radially outside the frictional surface 31a of the guide wheel 31 and opposite the rocking plate 42 (on the lower side in FIG. 4). The magnet 52 surrounds the portion of the flat belt 1 that is in contact with the wheel surface 31a. The main body of the case member 32A has a semicylindrical wall 53 formed on its inside. The semicylindrical wall 53 is spaced from and surrounds a rough half of the wheel surface 31a. The magnet 52 is fixed to the inner peripheral surface of the semicylindrical wall 53 by means of adhesion or the like.

The magnet 52 surrounds the portion of the flat belt 1 that is in contact with the guide wheel 31. Because ferrite (magnetic material) is mixed in the upper rubber layer 5 of the flat belt 1, magnetic force so acts as to force the belt 1 away from the frictional surface 31a of the guide wheel 31 radially outward of the wheel. As a result, except when the loose span of the flat belt 1 is pressed by the turning of the rocking plate 42, as stated earlier, the belt 1 is away from the wheel surface 31a and kept out of contact with it.

In other words, the one-way clutch 21 includes the ferrite mixed in the upper rubber layer 5 of the flat belt 1 and the magnet 52 spaced outward from this belt radially of the frictional surface 31a of the guide wheel 31. The magnet 52 biases the flat belt 1 radially outward from the wheel surface 31a.

Figure 5:
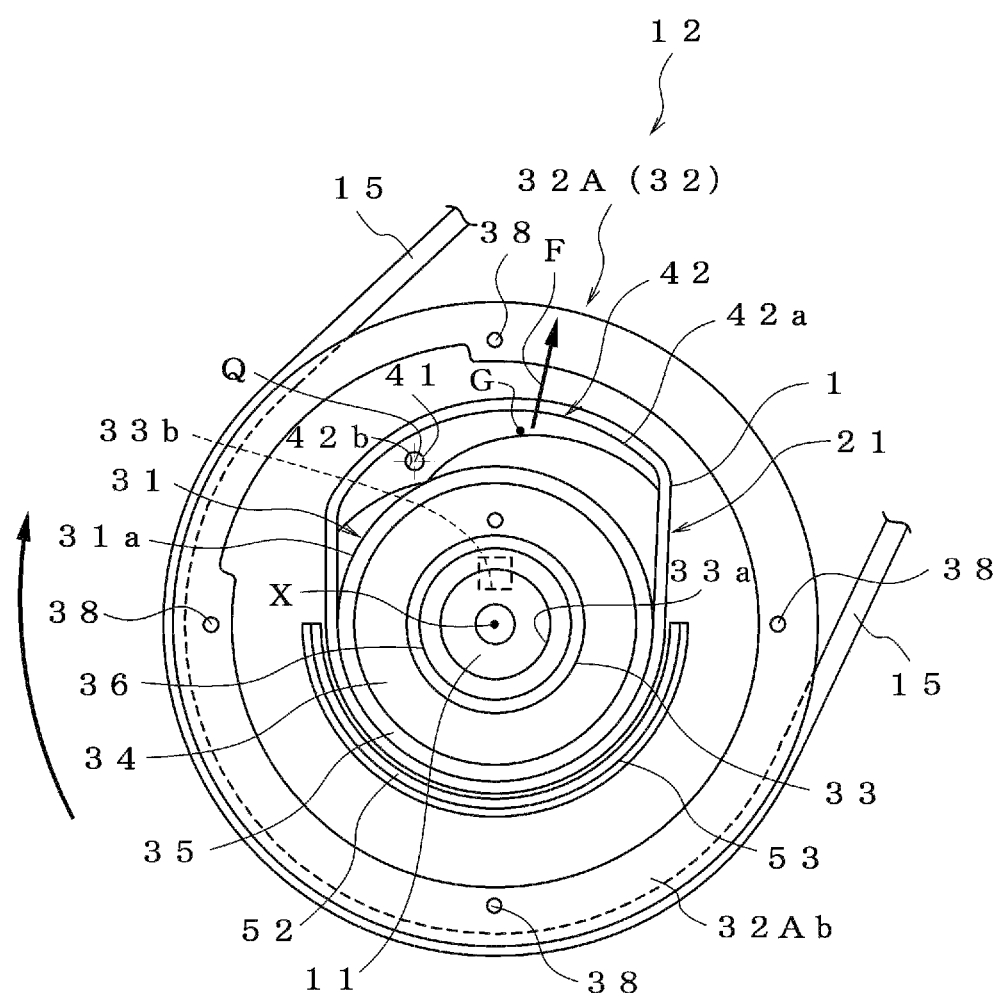
FIG. 5 is an illustration showing how the driving torque from a motor is transmitted when an engine starts.

The operation of the engine starter 10, which includes the one-way clutch 21, will be described below with reference to FIGS. 5 and 6, particularly in detail as to how the clutch 21 operates.

In order to start the engine, the motor rotates the motor pulley 14. The rotation of the motor pulley 14 is transmitted by the toothed belt 15 to the crank pulley 12, that is to say, the clutch case 32, so that the case 32 rotates clockwise in FIG. 5. At the moment when this rotation starts, the guide wheel 31, which is coupled to the crank shaft 11, is stopping, so that the rotation of the clutch case 32 that is relative to the guide wheel 31 loosens one of the two spans (the right span in FIG. 5) of the flat belt 1, which is passed between the wheel 31 and case 32.

Figure 6:
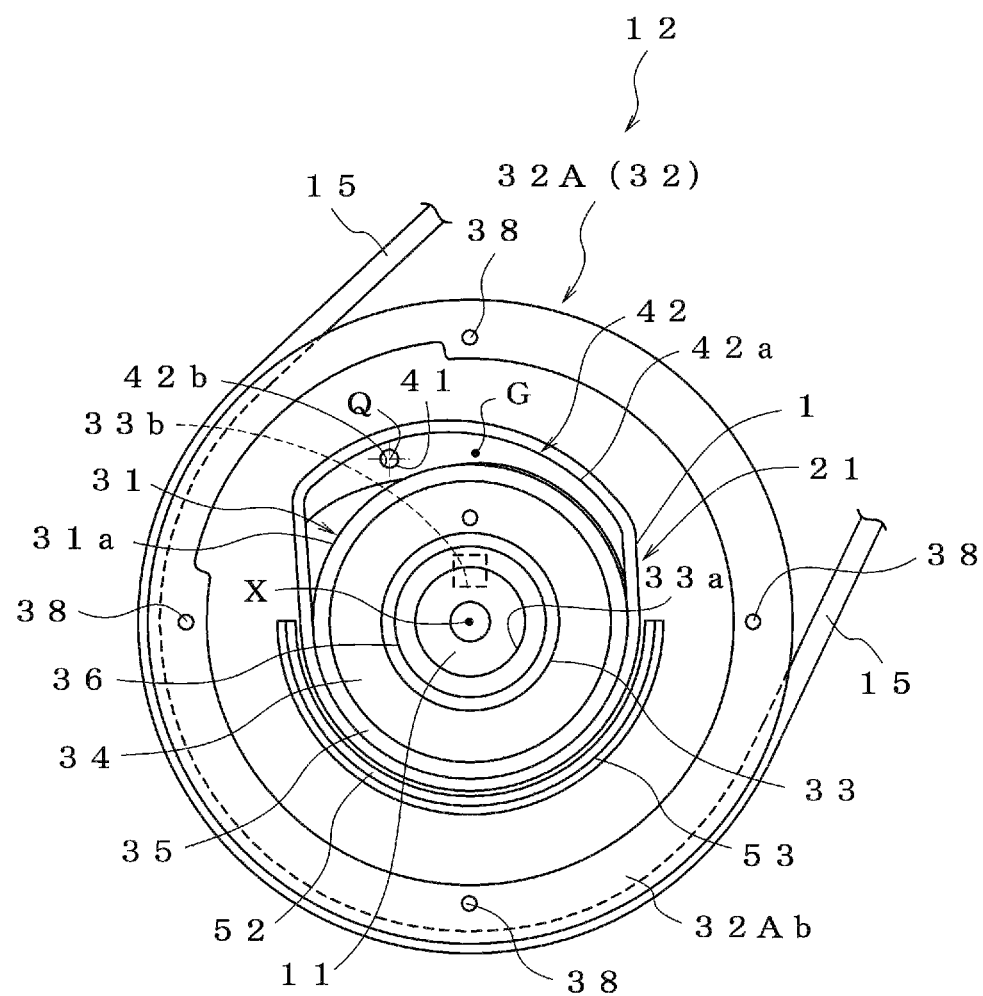
FIG. 6 is an illustration similar to FIG. 5, but showing how the driving torque from the crank shaft is interrupted after the engine starts.

The centrifugal force F created by the rotation of the clutch case 32 turns the rocking plate 42 around the needle roller 41 counterclockwise in FIG. 6, so that the leading end portion (the right end portion in FIG. 6) of the plate 42 presses the inside of the loose span (the right span in FIG. 6) of the flat belt 1. This forces the flat belt 1 into tight contact with the frictional surfaces 31a and 42a of the guide wheel 31 and rocking plate 42, so that the surfaces 31a and 42a secure gripping force. As a result, initial tension is applied to the flat belt 1.

Then, the clockwise rotation of the clutch case 32 that is relative to the guide wheel 31 pulls the trailing span (the left span in FIG. 6) of the flat belt 1 toward the case 32, tightening this span. This too exerts torque counterclockwise in FIG. 6 on the rocking plate 42. As a result, the leading end portion (the right end portion in FIG. 6) of the rocking plate 42 presses the loose span (the right span in FIG. 6) of the flat belt 1 strongly and radially outward, increasing the tension of the belt 1. This makes torque ready to be transmitted from the guide wheel 31 through the flat belt 1 to the clutch case 32. In other words, this makes the one-way clutch 21 ready to transmit torque. The transmitted torque drives the crank shaft 11, starting the engine.

When the engine starts, the crank shaft 11 starts to rotate autonomously, so that the guide wheel 31, which is coupled to it, starts to rotate clockwise. Immediately after the engine starts, its warming-up increases the speed of rotation of the crank shaft 11 rapidly. Then, even if the clutch case 32 is rotating inertially in the one-way clutch 21 in the same direction as when the engine starts, the crank shaft 11, that is to say, the guide wheel 31 rotates faster than the case 32, so that the wheel 31 and case 32 rotate relative to each other in the opposite direction to the direction in which they rotate relative to each other when the engine starts to rotate.

If the clutch case 32 is rotating inertially, as stated above, the centrifugal force turns the rocking plate 42, so that the plate 42 presses the flat belt 1. However, because the guide wheel 31 and clutch case 32 are rotating relative to each other in the opposite direction to the direction in which they rotate relative to each other when the engine starts to rotate, the rotation of the guide wheel 31 pulls the leading span (the right span in FIG. 6) of the flat belt 1 toward the wheel. As a result, the rocking plate 42 turns clockwise.

In other words, contrary to the case when the engine starts, the leading span (the right span in FIG. 6) of the flat belt 1 is the tight span. Accordingly, even with the centrifugal force exerted on the leading end portion (the right end portion in FIG. 6) of the rocking plate 42, the tight span of the flat belt 1 presses this portion toward the guide wheel 31, shifting the portion radially inward. In other words, the rocking plate 42 turns clockwise around the needle roller 41, so that the tension of the flat belt 1 decreases greatly.

In the meantime, the trailing end portion (the left end portion in FIG. 6) of the rocking plate 42 shifts radially outward, pressing the loose span of the flat belt 1. However, because the trailing end portion is shorter than the leading end portion of the rocking plate 42, the trailing end portion cannot press the loose span to such a degree as to increase the tension of the flat belt 1. After all, the tension decreases rapidly, so that the flat belt 1 is kept from transmitting torque between the guide wheel 31 and rocking plate 42.

This interrupts the torque transmission between the guide wheel 31, which is coupled to the crank shaft 11, and the clutch case 32, that is to say, the crank pulley 12 in the one-way clutch 21. Accordingly, when the motor stops after the engine starts, the motor pulley 14, toothed belt 15 and crank pulley 12 (the clutch case 32) stop rapidly, as shown in FIG. 6, and only the guide wheel 31, which is coupled to the crank shaft 11, rotates clockwise. Thus, even while the engine is running, not only the motor but also the toothed belt 15 does not rotate with the crank shaft 11, so that no loss is caused in the driving force of the engine.

When the motor stops, the clutch case 32 stops, as stated above, so that no centrifugal force acts on the rocking plate 42. This keeps the rocking plate 42 from pressing the flat belt 1, which is pressed by it when the engine starts. As a result, the flat belt 1 loosens, and its lower half round in FIG. 6 is attracted by the magnet 52 away from the frictional surface 31a of the guide wheel 31. This keeps the flat belt 1 and guide wheel 31 out of contact with each other. Thus, while the engine is running, the wheel surface 31a and flat belt 1 do not slip on each other in the one-way clutch 21, so that the durability may not decrease due to abrasion.

In the foregoing embodiment, the holding rubber layers 3 and 4 hold the tension-resistant layer 2 (core cord 2a). With such holding rubber layers omitted, as shown in FIG. 1(b), a flat belt 1' can be thin by consisting of a core cord 2a (a tension-resistant layer), an upper rubber layer 5' and a lower rubber layer 6'. The rubber layers 5' and 6' hold the core cord 2a. In this case too, 150-300 parts by weight of ferrite for 100 parts by weight of rubber matrix are mixed in the upper rubber layer 5'. Even if ferrite is mixed in the lower rubber layer 6', the mixed ferrite ranges between 0 and 50 parts by weight for 100 parts by weight of rubber matrix.

The foregoing embodiment as described above can be applied to the one-way clutch disclosed in Patent Document 1, but the present invention is not limited to it. Another embodiment can be applied likewise if it includes a mechanism that can transmit mechanical power to a belt by applying belt tension, and that interrupts the power transmission to the belt by slackening the belt tension, and if the embodiment further includes a magnetic material and a magnet that forces the belt and a guide wheel away from each other so as to prevent the wheel and the belt from keeping slipping on each other while the power transmission to the belt is interrupted.

LEGENDS OF REFERENCE NUMERALS

1: flat belt
2: tension-resistant layer
2a: core cord
3: upper holding rubber layer
4: lower holding rubber layer
5: upper rubber layer
6: lower rubber layer
10: engine starter
21: one-way clutch
31: guide wheel
52: magnet

What is claimed is:

1. A flat belt for use in a clutch mechanism that transmits mechanical power to a rotating member by bringing the belt into contact with an outer peripheral frictional surface of the rotating member by applying belt tension to the belt, and that interrupts the power transmission by forcing the belt away from the frictional surface by means of a magnetic force of a magnet by slackening the belt tension, the belt comprising:
   a lower rubber layer having 0-50 parts by weight magnetic material for 100 parts by weight rubber matrix laid on an inner peripheral side for contact with the rotating member; and
   an upper rubber layer laid on an outer peripheral side opposite to the lower rubber layer;
   the upper rubber layer being formed of rubber in which magnetic material is mixed at 150-300 parts by weight magnetic material for 100 parts by weight of rubber matrix.

2. A flat belt as claimed in claim 1, wherein the magnetic material in the lower and upper rubber layers is ferrite.

3. A flat belt as claimed in claim 2, wherein an upper holding rubber layer and a lower holding rubber layer are laid between an upper side of the lower rubber layer and a lower side of the upper rubber layer, and wherein a tension-resistant layer is held by the holding rubber layers.

4. A flat belt as claimed in claim 2, wherein a tension-resistant layer is interposed between an upper side of the lower rubber layer and a lower side of the upper rubber layer.

5. A flat belt as claimed in claim 1, wherein an upper holding rubber layer and a lower holding rubber layer are laid between an upper side of the lower rubber layer and a lower side of the upper rubber layer, and wherein a tension-resistant layer is held by the holding rubber layers.

6. A flat belt as claimed in claim 1, wherein a tension-resistant layer is interposed between an upper side of the lower rubber layer and a lower side of the upper rubber layer.

7. A clutch mechanism that transmits mechanical power to a rotating member by contacting an outer peripheral surface of the rotating member with a tensioned belt, and wherein the mechanical power transmitted to the rotating member is interrupted by forcing the belt away from a frictional surface by means of a magnet force of a magnet, thereby slackening the belt tension, said belt comprising:

a lower rubber layer having 0-50 parts by weight magnetic material for 100 parts by weight rubber matrix laid on an inner peripheral side for contact with the rotating member; and an upper rubber layer laid on an outer peripheral side opposite to the lower rubber layer;

the upper rubber layer being formed of rubber in which magnetic material is mixed at 150-300 parts by weight magnetic material for 100 parts by weight of rubber matrix.

8. The clutch mechanism of claim 7, wherein the magnetic material is ferrite.

9. A clutch mechanism as claimed in claim 8, wherein an upper holding rubber layer and a lower holding rubber layer are laid between an upper side of the lower rubber layer and a lower side of the upper rubber layer, and wherein a tension-resistant layer is held by the holding rubber layers.

10. A clutch mechanism as claimed in claim 8, wherein a tension-resistant layer is interposed between an upper side of the lower rubber layer and a lower side of the upper rubber layer.

11. A clutch mechanism as claimed in claim 7, wherein an upper holding rubber layer and a lower holding rubber layer are laid between an upper side of the lower rubber layer and a lower side of the upper rubber layer, and wherein a tension-resistant layer is held by the holding rubber layers.

12. A clutch mechanism as claimed in claim 7, wherein a tension-resistant layer is interposed between an upper side of the lower rubber layer and a lower side of the upper rubber layer.

* * * * *